United States Patent [19]

Class

[11] Patent Number: 5,665,830
[45] Date of Patent: Sep. 9, 1997

[54] CONTROLLING PREMATURE CURING OF VULCANIZABLE HALOGEN-CONTAINING POLYMERS

[75] Inventor: Jay Bernard Class, Wilmington, Del.

[73] Assignee: Hercules Incorporated, Wilmington, Del.

[21] Appl. No.: 681,020

[22] Filed: Jul. 22, 1996

Related U.S. Application Data

[63] Continuation of Ser. No. 355,368, Dec. 13, 1994, abandoned, which is a continuation-in-part of Ser. No. 184,714, Jan. 21, 1994, abandoned, which is a continuation-in-part of Ser. No. 168,695, Dec. 16, 1993, abandoned.

[51] Int. Cl.$^6$ .................. C08C 19/22; C08F 8/00
[52] U.S. Cl. .................. 525/349; 525/331.1; 525/384
[58] Field of Search .................. 525/349, 384; 528/417, 419, 421

[56] References Cited

U.S. PATENT DOCUMENTS

| | | | |
|---|---|---|---|
| 3,355,423 | 11/1967 | Scullin et al. | |
| 4,128,510 | 12/1978 | Richwine | 525/349 |
| 4,288,576 | 9/1981 | Richwine | |
| 4,392,262 | 7/1983 | Jablonski | 525/349 |
| 4,434,274 | 2/1984 | Jablonski | 525/349 |
| 4,482,681 | 11/1984 | Berta | 525/349 |
| 4,591,617 | 5/1986 | Berta | 525/187 |
| 4,745,147 | 5/1988 | Honsberg | 524/386 |
| 5,229,197 | 7/1993 | Peterson | 428/246 |

FOREIGN PATENT DOCUMENTS 0 221 313  9/1986  European Pat. Off.

OTHER PUBLICATIONS

Hercules Incorporated Elastomer Chemicals—"Echo™ S Vulcanizing Agent", Dec. 1978.
Hercules Incorporated Elastomer Chemicals—"Echo™ P Vulcanizing Agent", Dec. 1978.
ASTM D 2084–92—"Standard Test Method for Rubber Property—Vulcanizing Using Oscillating Disk Cure Meter".
European Patent Office Communication purusuant to Article 96(2) and Rule 51(2) EPC.
Rompp Chemie Lexikon, p. 3532 (1992).

*Primary Examiner*—Christopher Henderson
*Attorney, Agent, or Firm*—Mark D. Kuller; Robert O'Flynn O'Brien; Robert Reichert

[57] ABSTRACT

A process of reducing the effects of moisture during storage prior to vulcanization of a vulcanizable halogen-containing polymer composition containing water, comprising blending before storage, into said vulcanizable composition, a thioester derivative of 2,5-dimercapto-1,3,4-thiadiazole crosslinking agent and polyethylene glycol, whereby the scorch time of the vulcanizable compound is not significantly affected by the water content of said composition. The invention is also directed to a vulcanizable halogen containing material and a dry pourable composition, both comprising the crosslinking agent and polyethylene glycol, as well as a process of reworking such a halogen-containing vulcanizable composition.

15 Claims, 6 Drawing Sheets

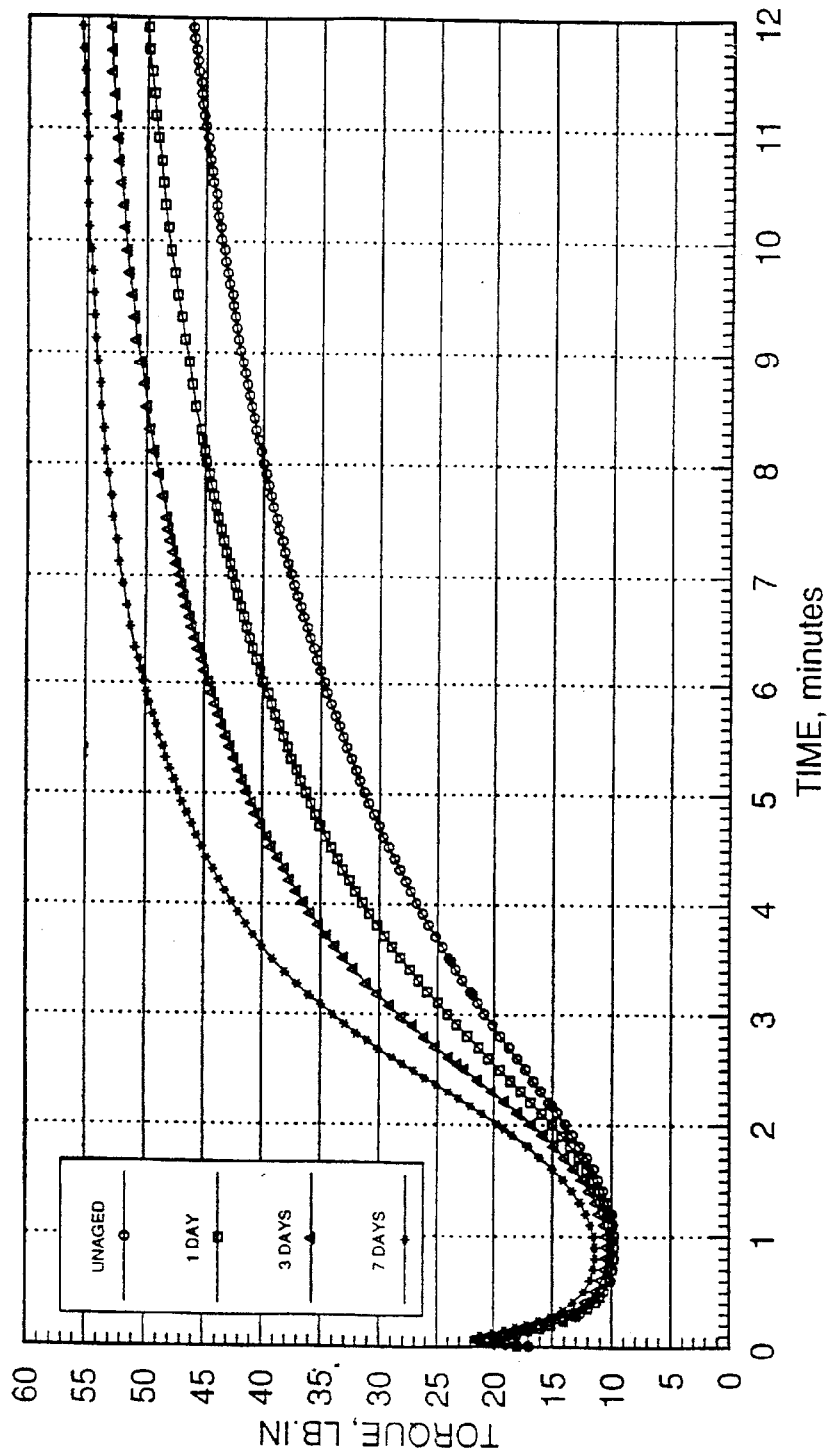

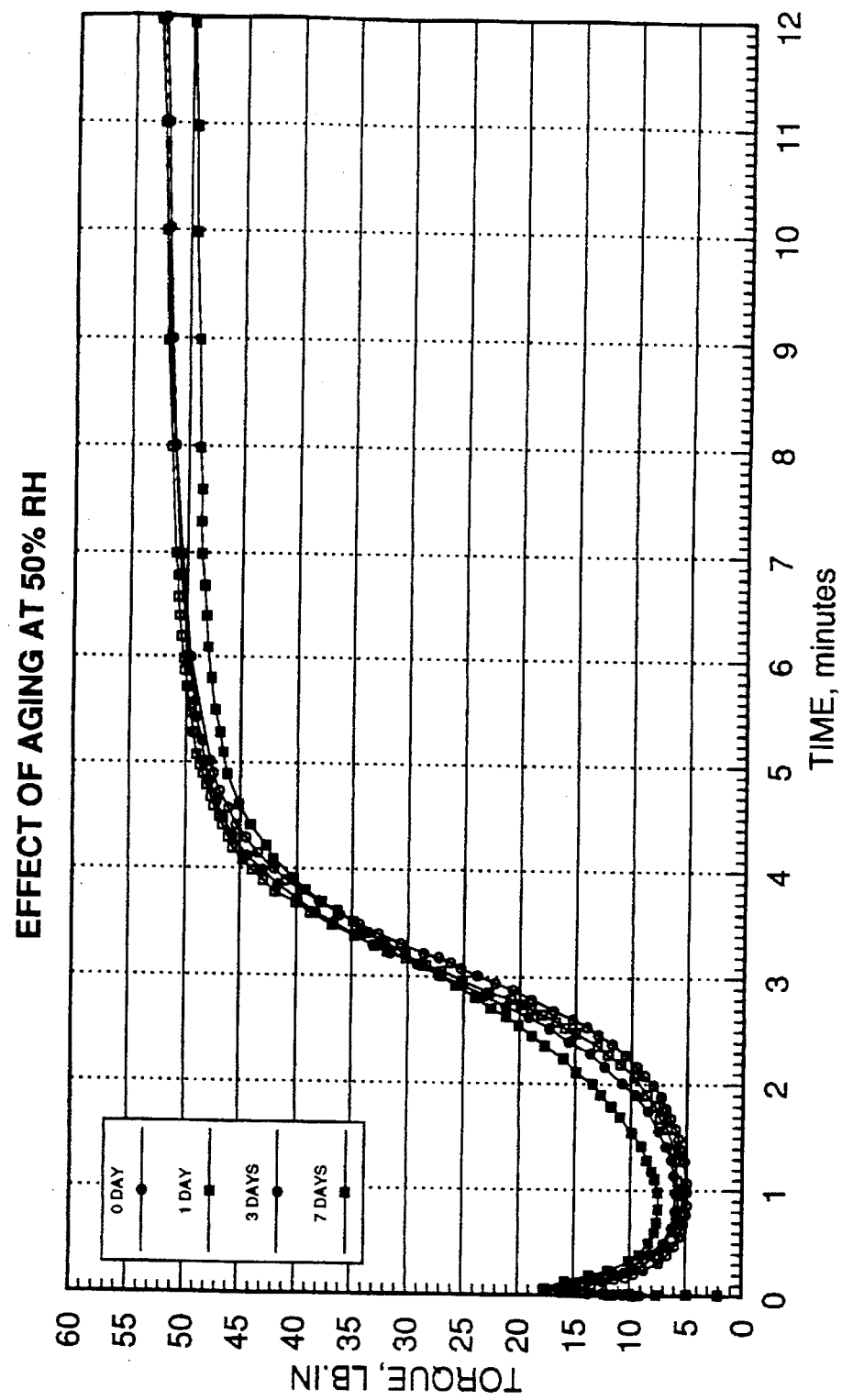

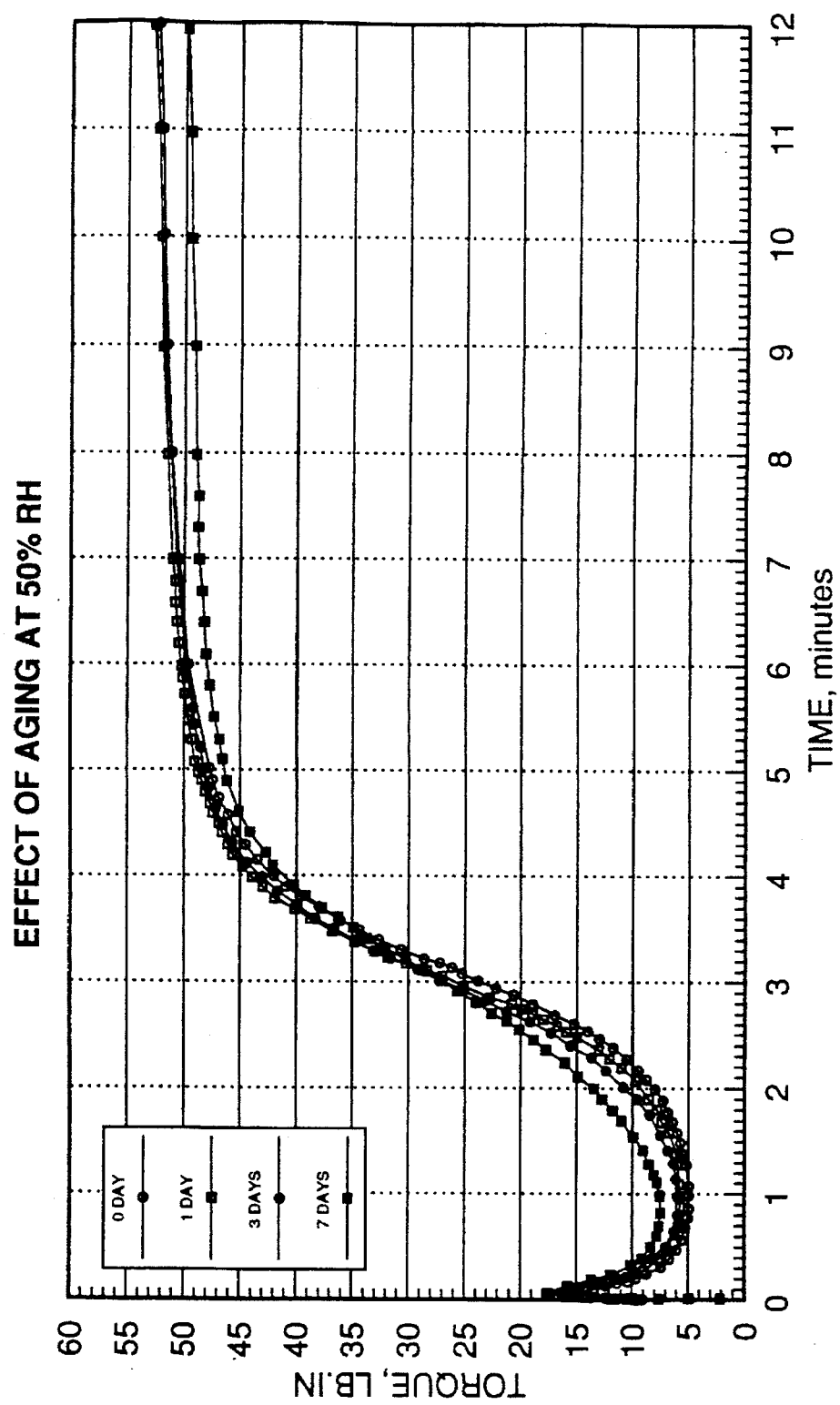
FIGURE 2 – DEG
SAMPLE 21

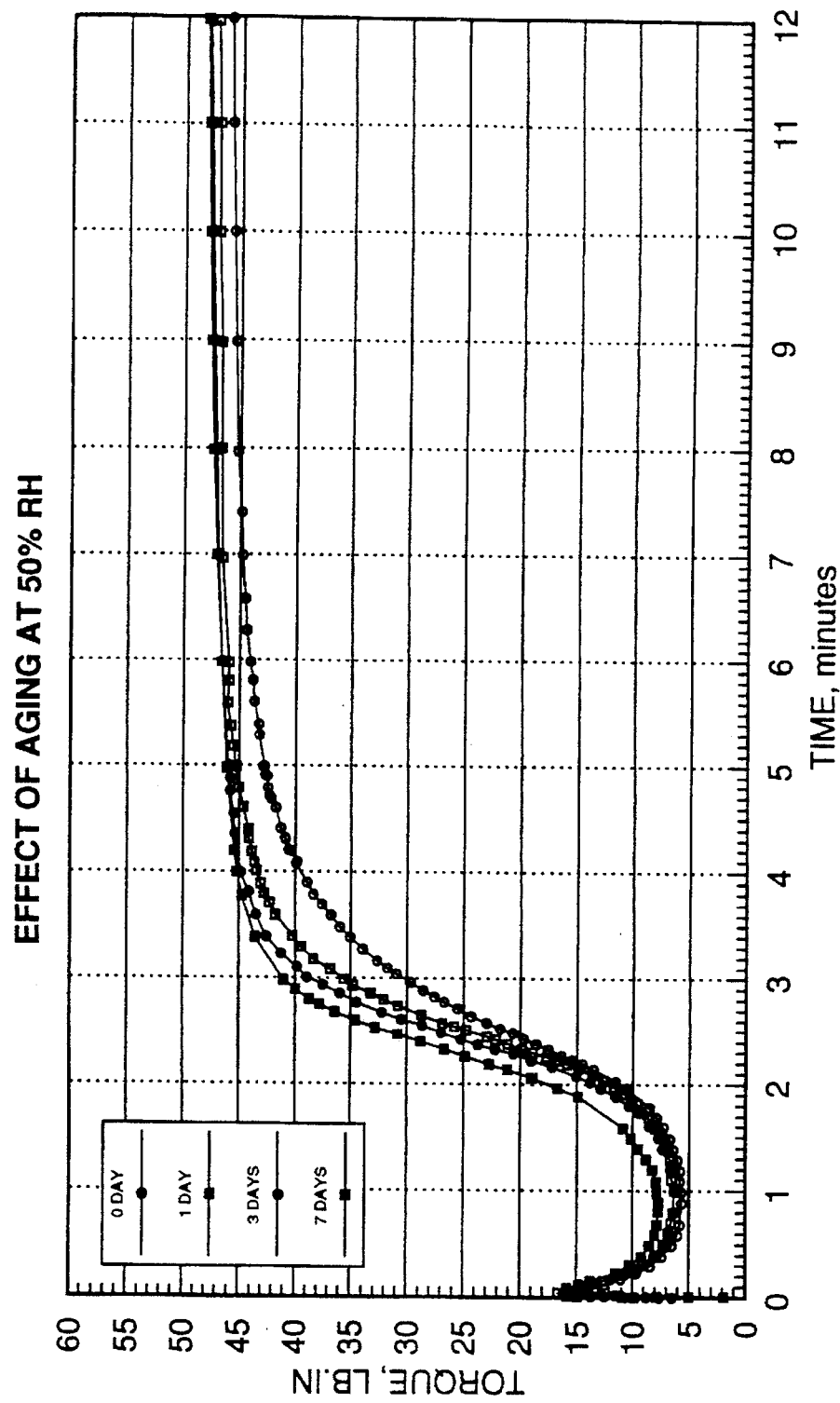

SAMPLE 20

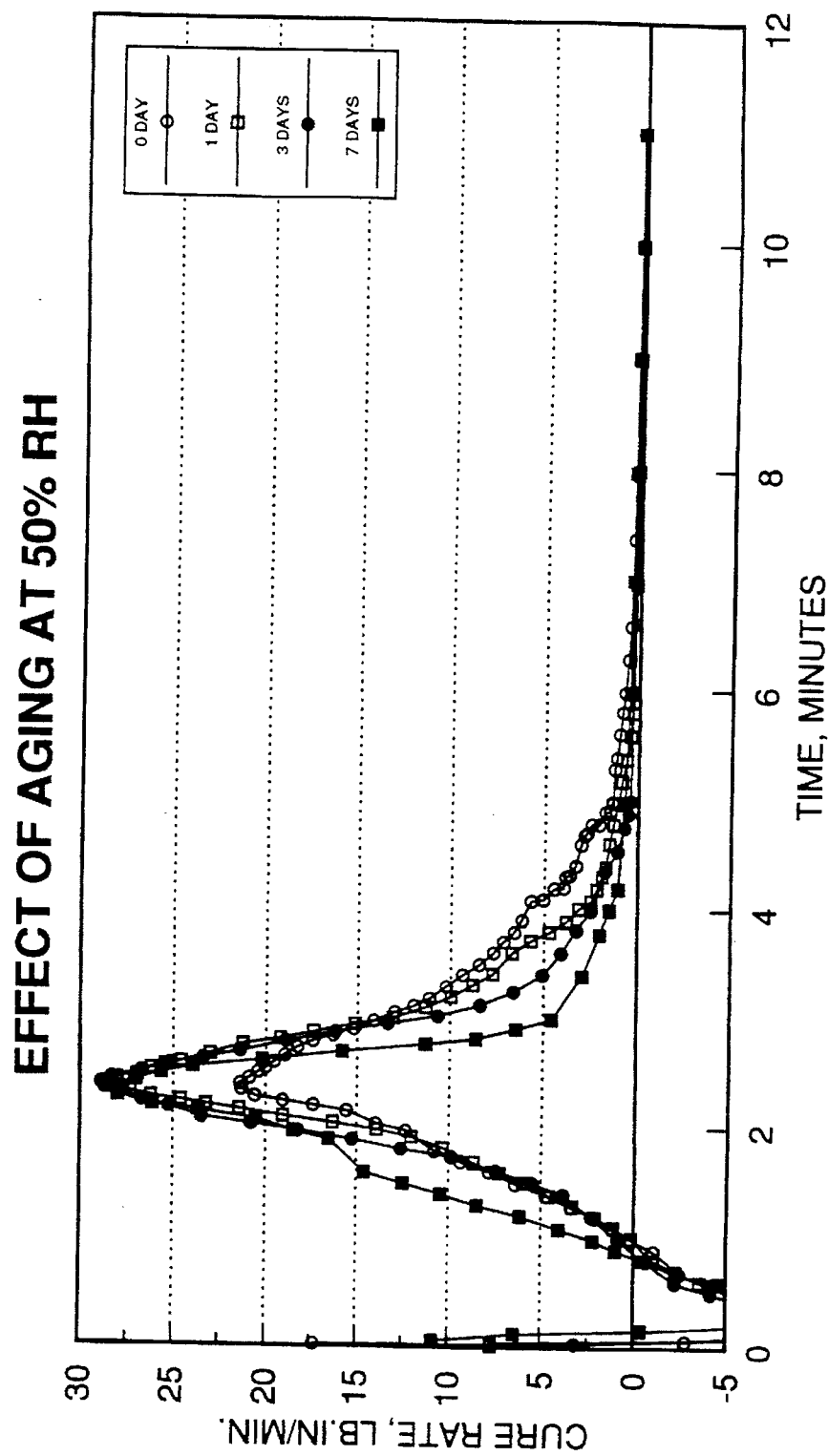
FIGURE 6 - PEG
SAMPLE 22

CONTROLLING PREMATURE CURING OF VULCANIZABLE HALOGEN-CONTAINING POLYMERS

This application is a continuation of application Ser. No. 08/355,368, filed Dec. 13, 1994, now abandoned, which is continuation-in-part of application Ser. No. 08/184,714, filed Jan. 21, 1994, now abandoned, which is a continuation-in-part of application Ser. No. 08/168,695, filed Dec. 16, 1993, now abandoned. This application relates to application Ser. No. 08/623,517, filed Mar. 28, 1996, which is a continuation of application Ser. No. 08/184,714, filed Jan. 21,1994, now abandoned, which is a continuation-in-part of application Ser. No. 08/168,695, filed Dec. 16, 1993, now abandoned.

In the production of vulcanized halogen-containing polymers, the use of mercapto compounds as crosslinking agents, and the use of various other additives to improve curing speed, strength and stability of the vulcanizates are known. See the hereinafter referred to patents, all of which are incorporated herein by reference. Vulcanization by these conventional techniques tends to be erratic and not reproducible if a mixed uncured composition has been stored. Scorching of the fresh unvulcanized (green) material takes place during storage, even at room temperature, which affects the cure conditions required to manufacture useful parts.

Scorching is thought to be the premature start of the curing reaction, including some crosslinking, which affects subsequent curing of the material. This may reduce the cure time to the point where the compound cures before the part is properly molded. Scorched compound may be partially gelled and have a higher viscosity than unscorched compound. This may reduce flow so that molds cannot be filled completely. Often improperly cured products must be discarded.

It has been observed that differences in water content of the compositions appear to be largely responsible for the scorching. Water may be absorbed by the green compositions from humidity in the air, or by inclusion in the individual ingredients, notably carbon black. Such vulcanizable compositions absorb water in normal storage, usually in an amount ranging from about 0.05% to about 2% by weight depending on the relative humidity and the length of storage.

U.S. Pat. No. 4,128,510 describes the use of broad classes of derivatives of 2,5-dimercapto-1,3,4-thiadiazole as crosslinking agents for halogen-containing polymers to produce vulcanizates of increased strength and stability.

U.S. Pat. No. 4,288,576 discloses the use as the crosslinking agent of 2,5-dimercapto-1,3,4-thiadiazole in the presence of certain basic materials to produce vulcanizates of good stability.

U.S. Pat. No. 4,482,681 shows the use of a crosslinking system for halogen-containing polymers made up of a polymercapto compound or an ester derivative thereof as the crosslinking agent, a basic material and a hydrated salt to increase the rate of crosslinking.

U.S. Pat. No. 4,745,147 discloses curable compositions comprising chlorinated polyethylene, a polymercapto compound, an aliphatic polyhydroxy compound, an inorganic acid acceptor and an initiator which is an amine, or a quaternary ammonium salt or a quaternary phosphonium salt. Aliphatic polyhydroxy alcohols mentioned include 2,2-dimethyl-1,3-propanediol, ethylene glycol, glycerol, 1,2-propanediol, dipentaerythritol and pentaerythritol.

SUMMARY OF THE INVENTION

It has been found that water-induced scorching of halogen-containing polymer vulcanizable compositions can be masked, greatly decreasing the effect of water-induced scorching by (1) selecting a thioester derivative of 2,5-dimercapto-1,3,4-thiadiazole as the crosslinking agent and (2) including in the compositions polyethylene glycol. Accordingly, this invention relates to a process of reducing the effects of moisture during storage prior to vulcanization of a vulcanizable halogen-containing polymer composition containing water, comprising blending before storage, into said vulcanizable composition, a thioester derivative of 2,5-dimercapto-1,3,4-thiadiazole crosslinking agent and polyethylene glycol, whereby the scorch time of the vulcanizable compound is not significantly affected by the water content of said composition. Preferably, according to this process, the cure time of the vulcanizable compound is acceptable for processing and is not significantly affected by the water content of said composition.

The invention is also directed to a vulcanizable halogen-containing polymer composition comprising a thioester derivative of 2,5-dimercapto-1,3,4-thiadiazole crosslinking agent and polyethylene glycol, said composition having a scorch time that is not significantly affected by the presence Of water in the composition. Preferably, said composition has a cure time that is acceptable for processing and is not significantly affected by presence of water in the composition.

BRIEF DESCRIPTION OF THE DRAWINGS

FIGS. 1—3 are ODR cure curves of the samples of Example 5, with FIG. 1 showing control samples and FIGS. 2 and 3 showing the invention. FIGS. 4–6 are cure rate curves, with FIG. 4 showing control samples and FIGS. 5 and 6 showing the invention.

DETAILED DESCRIPTION OF THE INVENTION

Figure 4:
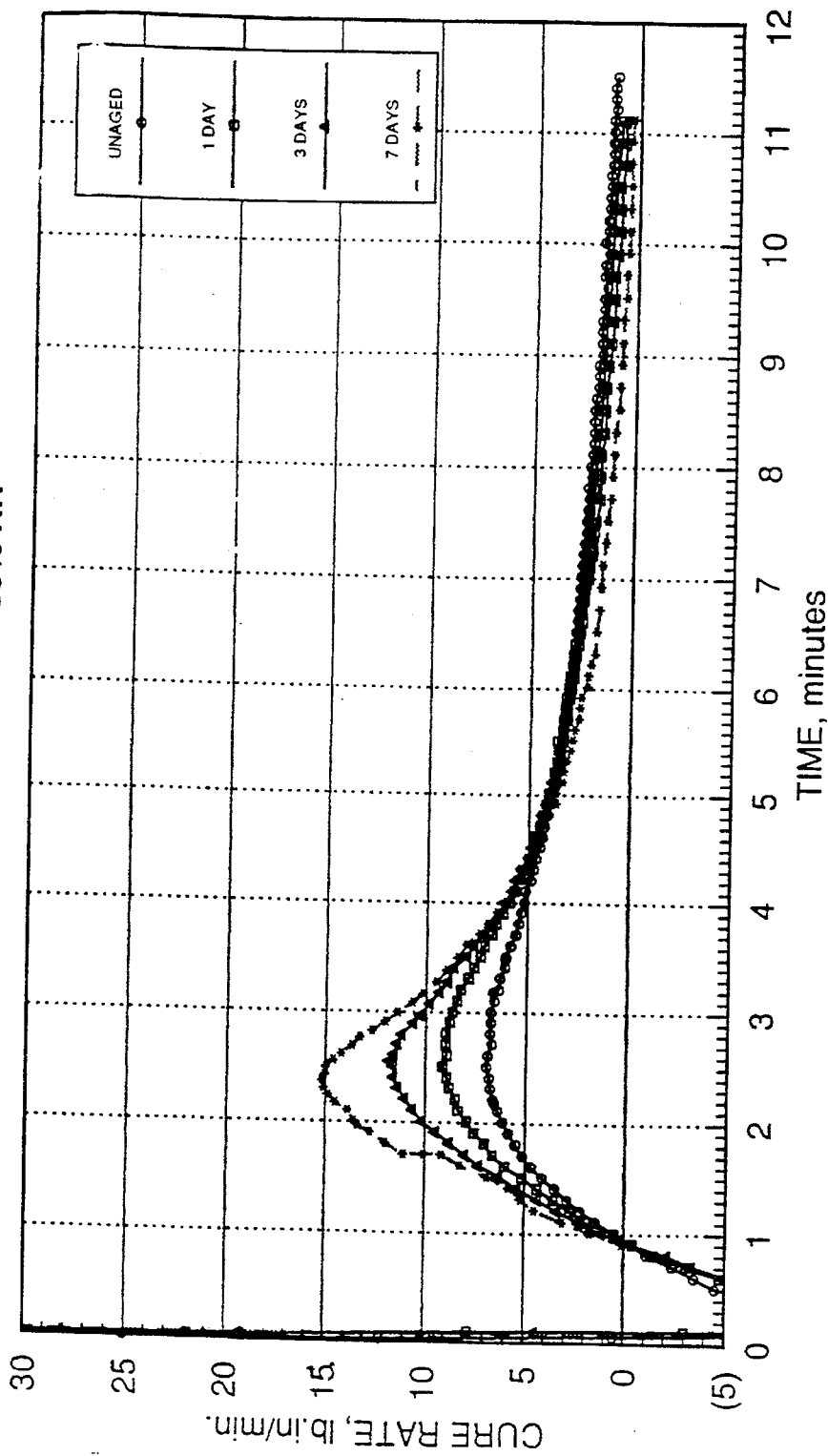

Preferably, the crosslinking agent is 2-mercapto-1,3,4-thiadiazole-5-thiobenzoate.

Preferably, the polyethylene glycol comprises a compound having the formula $HO-(CH_2CH_2O-)_nH$ wherein n is 2 to 14, more preferably 2–10. Preferred commercial polyethylene glycols include diethylene glycol (DEG), triethylene glycol (TEG) and tetraethylene glycol. DEG and TEG are most preferred because they are commonly available and work well. Other preferred polyethylene glycols are those of the above formula wherein n is 4–10.

Any saturated or unsaturated vulcanizable halogen-containing polymer, i.e. containing at least about 1% to 60% or more by weight of halogen, may be employed in the crosslinkable compositions of this invention. Preferred are homopolymers of epichlorohydrin; copolymers of epichlorohydrin and ethylene oxide or propylene oxide; terpolymers of epichlorohydrin, ethylene oxide or propylene oxide, and an unsaturated alkylene oxide; polychloroprene; chlorosulfonated polyethylene; chlorinated high density polyethylene; copolymers of alkyl acrylate and chloroalkyl acrylate; poly(vinyl fluoride); poly(vinyl chloride); poly(vinylidene chloride); and chlorobutyl rubber and bromobutyl rubber. A most preferred vulcanizable halogen-containing polymer is chlorinated polyethylene polymer. Other most preferred polymers are epichlorohydrin polymers, copolymers and terpolymers, polyacrylate rubber (polyalkyl acrylates containing a low concentration of chlorine as a crosslinking site), polychloroprene rubber, chlorobutyl rubber and bromobutyl rubber.

In addition, crosslinkable blends of halogen-containing polymers or halogen-containing polymers blended with nonhalogen-containing polymers may be used in the compositions and process of this invention. Examples of such non-halogen polymers are ethylene-propylene elastomers, nitrile elastomers, polyacrylate rubbers (non-halogen containing), and styrene-butadiene rubbers. The only requirement is that there be sufficient halogen-containing polymer present in the blend to effect crosslinking.

Herein, all parts are per hundred parts by weight rubber (phr) and percentages are by weight of the total composition except as otherwise noted.

The amount of thioester derivative of 2,5-dimercapto-1,3,4-thiadiazole crosslinking agent added will preferably be within from about 0.1 phr to about 20 phr, more preferably from about 0.5 phr to about 5 phr. Preferably, about 0.1 parts per hundred rubber (phr) to about 20 phr of polyethylene glycol is added to the unvulcanized compositions of the present invention, more preferably from about 0.5 phr to 10 phr, and most preferably from about 1 phr to about 7 phr.

In some cases it may be desirable to add a small amount of stabilizer. Total stabilizer in the present invention composition preferably is in the range of about 0.1 phr to 5 phr or more. Exemplary of the most preferable stabilizers are phenyl-β-naphthylamine, di-β-naphthyl-p-phenylenediamine, sym-di-β-naphthyl-p-phenylenediamine, styrenated diphenylamines, N-isooctyl-p-amino-phenol, the reaction product of diphenylamine and acetone, polymerized trimethyldihydroquinoline, 4,4'-thiobis(6-tert-butyl-m-cresol), the reaction product of crotonaldehyde and 3-methyl-6-tert-butyl-phenol, nickel dibutyldithiocarbamate, the zinc salt of 2-mercaptobenzimidazole, and nickel dimethyldithiocarbamate.

An acid acceptor may be used in conjunction with the thioester derivative of 2,5-dimercapto-1,3,4-thiadiazole in the crosslinking process of this invention. An acid acceptor is a basic material or a material which will become basic on heating to the crosslinking temperature. Typical useful inorganic materials are basic metal oxides and hydroxides and their salts with weak acids, such as, for example, magnesium oxide, magnesium hydroxide, calcium oxide, calcium hydroxide, barium oxide, barium carbonate, lead oxides, lead acetate, sodium phenoxide and sodium acetate. The acid acceptor may be added in a broad range, preferably from about 0.25 phr to about 50 phr, more preferably from about 0.5 phr to about 50 phr, and most preferably from about 1 phr to about 20 phr of the vulcanizable composition.

In the compositions of the present invention, an accelerator of the well-known types containing aliphatic or aromatic amine or quaternary nitrogen groups may be used. Preferably about 0.5 to 3 phr of accelerator is used. Particularly useful accelerators are the reaction products of butyaldehyde and aniline, and tetrabutylammonium bromide.

Other ingredients commonly used in rubber vulcanization can be included, for example, fillers, extenders, pigments, plasticizers, softeners, etc. The presence of a filler and, in particular, carbon black gives very advantageous results.

The crosslinking agent and other ingredients can be incorporated or admixed with the polymer in any desired fashion. For example, they can be uniformly blended with a polymer by mixing in a high intensity internal mixer, such as a "Banbury" mixer; or by simply milling on a conventional rubber mill to prepare the green compositions of the present invention. By this means, the agents are uniformly distributed throughout the polymer and uniform crosslinking is effected when the composition is thereafter subjected to curing heat. It is generally preferable to mix at temperatures from about 170° F. to about 250° F. because the compositions are usually relatively scorch-resistant below about 250° F. in the short mixing time. Other known methods of admixing the composition are also useful.

The conditions under which the crosslinking is effected can be varied over a wide range. Preferably the crosslinking temperature will be within the range of broadly from about 250° F. to over 425° F. and more preferably from about 340° F. to about 400° F. The time will vary inversely with the temperature and will preferably range from about 10 seconds to 24 hours, more preferably from about 2 to about 10 minutes. While the crosslinking process can be conducted in air at atmospheric pressure, it will generally be conducted in a metal mold or in a steam autoclave at the required temperature.

For ease of incorporating the crosslinking agent into the crosslinkable polymer mixture, it may be desirable to formulate the thiadiazole derivative as a concentrate in a binder or carrier which can be added, along with the other ingredients, in small amounts to the polymer composition without adverse effect on the properties of the crosslinked composition. Particularly advantageous binders or carriers are polymers which may or may not be crosslinkable by the crosslinking agent. Suitable binders for the concentrate are, for example, ethylene-propylene rubber, ethylene-propylene terpolymers, styrene-butadiene rubber, natural rubber, low density polyethylene, amorphous polypropylene and polyisobutylene. Other suitable binders or carriers for use in the preparation of such easily handled concentrates are waxes, resins, or other low-melting solids. Typical useful materials are paraffin wax, stearic acid, microcrystalline wax, rosin, rosin esters and hydrocarbon resins. Concentrations of the thiadiazole derivative can vary from less than 30% to more than 90%, preferably from about 50% to 80%. In the final prevulcanization green mix additional amounts of one or more of the active curing compounds may be added to give the desired vulcanization and vulcanizate properties. The acid acceptor should not be incorporated in the concentrate lest it decompose the thiadiazole derivative.

Another highly effective technique for simplifying final formulation is to prepare a dry pourable powder cure premix composition. Consequently, this invention is also directed to a composition in the form of a dry pourable powder cure premix composition for inclusion in a halogen-containing vulcanizable polymer composition, comprising a thioester derivative of 2,5-dimercapto-1,3,4-thiadiazole crosslinking agent, polyethylene glycol and a pourable siliceous finely divided filler. Preferably, the finely divided filler is selected from the group consisting of silica, talc and clay. This premix will contain enough of the filler to give a pourable powder formulation. Amounts of filler normally are about 10–50% by weight of the formulation. The remainder of the formulation usually is crosslinker and polyethylene glycol in the desired proportions for the particular usage. Other inert additives may also be included. This pourable premix avoids the handling of liquids when mixing these ingredients into the green pre-vulcanization products.

The vulcanizable compositions of this invention exhibit more uniform scorching over a prolonged period of storage, little affected by the moisture content of the mixture after storage. Also, scorching during storage is decreased. The present invention compositions, with changes in ingredients and their amounts, may give mixtures of different scorch characteristics. However, batches of the same ingredients in the same amounts will exhibit substantially the same scorch characteristics irrespective of the moisture content of the initial ingredients, the storage relative humidity, and length of storage. Consequently, these compositions give vulcanizates of highly uniform curing characteristics and cured physical properties when vulcanized under the same conditions. For instance, the fabricator can store a batch of green composition for a number of days, such as 1, 4, 14 or more, and regardless of moisture absorption by the composition, will be able to process the unvulcanized composition to meet product requirements.

While all of the ingredients are normally blended in a single operation, often it is possible to rework the initially blended compositions of the present invention to change the relative amounts of the ingredients or even to add an ingredient. For instance, if a sample of a composition of the instant invention made using polyethylene glycol is tested prior to use in production and the cure rate is too slow for processing in a specific production operation, then adjustments can be made in the concentration of crosslinker and/or accelerator (e.g., amine accelerator) to increase the cure rate. Compositions prepared following prior techniques generally can not be reworked because they are likely to scorch. Consequently, this invention is also directed to a process of reworking a vulcanizable halogen-containing polymer composition comprising sequentially blending before storage, into said vulcanizable composition, a thioester derivative of 2,5-dimercapto-1,3,4-thiadiazole crosslinking agent and polyethylene glycol, storing the vulcanizable halogen-containing polymer composition for one or more days, testing a sample of the vulcanizable halogen-containing polymer composition for at least one property selected from the group consisting of the cure rate or the scorch rate of the vulcanizable halogen-containing polymer composition and the physical properties of the vulcanized halogen-containing composition, and reformulating the vulcanizable halogen-containing polymer composition. Preferably, reformulating comprises adjusting the concentration in the vulcanizable halogen-containing polymer composition of at least one member selected from the group consisting the thioester derivative of 2,5-dimercapto-1,3,4-thiadiazole crosslinking agent and polyethylene glycol. In another preferred embodiment, the composition comprises one or more additives selected from the group consisting of accelerators, acid acceptors, binders, stabilizers, fillers, extenders, pigments, plasticizers, and softeners, and the reformulating comprises adjusting the concentration of the one or more additive in the vulcanizable halogen-containing polymer composition.

The following examples illustrate the preparation of the vulcanizable compositions and vulcanizates thereof, properties of the vulcanizates, and the effect of water on scorching and the masking of the scorching in vulcanizates made from the present compositions. All compositions of the examples are given in parts by weight per hundred parts of the rubber (halogen-containing polymer) content (phr) except where indicated otherwise.

In the following examples the ingredients were mixed using standard procedure on laboratory mixers. Rubber physical properties were determined following ASTM D&12-92. The extent of cure was measured from data obtained using a Monsanto oscillating disk rheometer (ODR) following the procedure of ASTM D208-92. Scorch time was reported as $t_s2$, the time in minutes from closure of the ODR cavity until the torque increased 2 lbf.in above the minimum torque, which occurs a short time after cavity closure when the applied heat decreases the viscosity and lowers the torque before significant crosslinking occurs. Shorter scorch times during curing indicate that more scorch has taken place before curing, as compared to unaged composition. Thus, a reduction in the rate of scorching increase during storage is shown by a longer scorch time ($t_s2$). Cure time was reported as $t_{90}$, the time in minutes from closure of the ODR to reach 90% of increase from minimum to maximum vulcanization (cure) torque. Another advantage of this invention is the reduced time to cure show by the $t_{90}$ data.

Curing of the present invention compositions is not significantly affected by the presence of normal amounts of water absorbed during storage, typically at least about 0.05% by weight, more typically from about 0.05 to about 2% by weight, and often about 0.2% to 2% by weight of the composition. This is indicated by the scorch times and cure times of the compositions which are not significantly affected by the water content of the compositions. Scorch time and cure time are quantified in terms of the performance of the composition under curing conditions.

Thus, as the terminology is used herein, scorch time and cure time of a composition are not significantly affected by the presence of water when in curing using the conditions of Example 1 (ODR at about 360° F., 3° arc and 100 cpm), the scorch time and cure time ($t_s2$ and $t_{90}$ as herein defined) of tests 3–10 are not significantly changed by water absorption during storage. "Not significantly changed", as used herein, means that neither nor $t_{90}$ of the composition during such curing decreases (as compared to the $t_s2$ and $t_{90}$ of the green, substantially moisture-free, unstored composition) after storage at ambient conditions of about 23° C. and 50% relative humidity of the composition for 1, 4 and 14 days by more than 30%, 50% and 75%, respectively; preferably, not more than 20%, 30% and 40%, respectively; and, most preferably, not more than 5%, 10% and 15%, respectively. (In other words, the compositions of this invention are capable of being stored for these periods of time with no more than the percentage increased specified.)

The most desirable relationship between these parameters is a sufficiently long scorch time to allow the compositions to be processed before start of cure, followed by a rapid cure. Provided the scorch time is adequate for handling, the smaller the $t_{90}$ to $t_s2$ ratio, the better the cure procedure. Since the compositions of the present invention mask the scorch effect of water, storage accompanied by the absorption of water does not affect the cure conditions. Thus, the cure/scorch time ratio of a composition of the present invention does not change significantly during storage, i.e., 1, 4, 14, days or more at ambient conditions of about 23° F. and 50° relative humidity. By "does not change significantly" it is meant that the $t_{90}/t_s2$ ratio does not change after 1, 4 and 14 days by more than about 35%, preferably not more than about 20%, and most preferably by not more than about 5%. (In other words, the compositions of this invention are capable of being stored for these periods with no more than the percentage change specified.)

(While the tests presented herein are specific with respect to temperature and humidity, it should be understood that the vulcanizable compositions may be stored at temperatures and relative humidity normally encountered in commercial practice. Such relative humidities may typically range from about 20% to 100%.)

One additional advantage of the instant invention with respect to compositions comprising chlorinated polyethylene polymer is that $t_{90}/t_s2$ ratios below 4, preferably below 3, may be achieved.

Table 1 gives the ingredients in phr of compositions A and B used in Examples 1 to 4, excluding crosslinking agents 2-mercapto-1,3,4-thiadiozate-5-thiobenzoate ("ECHO" A, made by Hercules Incorporated), and DEG and/or TEG. Chlorinated polyethylene (CPE) polymer containing 36% chlorine was used (Tyrin CM 0136, Dow Chemical Co., Plaquemine, La.

TABLE 1

| Ingredient | Composition A | Composition B |
| --- | --- | --- |
| CPE | 100 | 100 |
| carbon black, N550* | 50 | — |
| carbon black, N762* | — | 50 |
| Plasticizer A (a) | 35 | — |
| Plasticizer B (b) | — | 30 |
| Magnesium Oxide | 5 | 10 |
| Stabilizer (c) | 2 | — |
| Amine Accelerator (d) | 1.15 | 1 |

*ASTM D1765-91
(a) trioctyl trimellitate
(b) di (butoxyethyoxyethyl) adipate
(c) styrenated diphenylamines ("Wingstay, 29, The Goodyear Tire and Rubber Co.)
(d) N-phenyl-3,5-diethyl-2-propyl-1,4-dihydropyridine ("Vanax" 808, R. T. Vanderbilt Company, Incorporated)

In the tables of the examples, $T_{min}$ is the torque in lbf.in when the composition reaches its minimum torque as the viscosity of the composition in the ODR decreases on heating before significant crosslinking. $T_{max}$ is the torque when maximum cure is reached, as indicated by no further torque increase with further heating time. $\Delta T$ is the difference from minimum to maximum torque (100% cure); $t_{90}$ and $t_s2$ are defined above. Motor time is the time for the recorder pen of the data plotter to traverse the plotting span of the recorder paper, starting at the closing of the ODR cavity.

EXAMPLE 1

This example illustrates in Tests 3–10 the preferred practice of the present invention using DEG and TEG. The compositions of the Example 1 consist of compositions A (193.15 parts) or B (191.0 parts) of Table 1 and contain 2 phr "ECHO" A; Tests 1 and 2 contain no DEG or TEG additive; Tests 3–10 contain the indicated amounts of DEG (99+%, Aldrich Chemical Co., Milwaukee, Wisc.) or TEG (99+%, Aldrich Chemical Co.). Tests 3–10 demonstrate the excellent curability of the vulcanizable compositions of the present invention as compared to Tests 1 and 2, which do not contain DEG or TEG additive. Curing was carried out in these examples using an ODR at 360° C., 3° arc and 100 cpm. These tests were performed on unstored, freshly formulated compositions. The curing results are shown in Table 2.

In Tests 3–10 all of the scorch times of the present invention compositions were adequate and all of the $t_{90}/t_s2$ ratios very good, being less than 4. Of particular importance are the extremely rapid $t_{90}$ times for the compositions of the present invention containing both 2-mercapto-1,3,4-thiadiozate-5-thiobenzoate and DEG or TEG.

EXAMPLE 2

This example illustrates the preparation from compositions of the present invention, of vulcanizates after storage of the compositions at ambient conditions, approximately 23° C. and 50% relative humidity. Tests #11, 12 & 13 were the compositions of Tests #3, 5 & 7 respectively, cured under the same conditions. The curing results are shown in Table 3.

TABLE 3

| | CURE TIMES, 14 DAYS STORAGE | | |
| --- | --- | --- | --- |
| Test # | 11 | 12 | 13 |
| $T_{min}$ | 10.5 | 11.0 | 10.2 |
| $T_{max}$ | 57.0 | 61.3 | 58.1 |
| $\Delta T$ | 46.5 | 50.3 | 47.9 |
| $t_s2$ | 1.48 | 1.24 | 1.49 |
| $t_{90}$ | 4.85 | 3.45 | 4.7 |
| $t_{90}/t_s2$ | 3.28 | 2.78 | 3.15 |

In Tests 11–13, the scorch times and $t_{90}/t_s2$ ratios were excellent when the compositions were cured after 14 days storage. Most significantly, the cure/scorch time ratios were not significantly greater than the ratios of Tests 3, 5 and 7 using fresh unstored compositions. The 14 days storage, with the compositions absorbing moisture, had little effect on the important $t_{90}/t_s2$ cure/scorch time ratios.

EXAMPLE 3—PHYSICAL PROPERTIES

The tests of this example show the physical properties of vulcanizates from unaged compositions of the present invention press cured five minutes at 360° F. All of the tests used 193.5 parts of mixture B from Table 1 and contained 2 phr of "ECHO" A. Test 14 contained no DEG or TEG additive; Tests 15–18 contained the listed additive, illustrating the preferred practice of the present invention with DEG and also TEG. In Table 4, M100, M200 and M300 are the psi required to extend the vulcanized test samples 100, 200 and 300% respectively; TB is the tensile strength at break; EB is the % elongation at break, and Hardness is Shore A.

TABLE 2

| | COMPOSITIONS AND CURE TIMES | | | | | | | | | |
| --- | --- | --- | --- | --- | --- | --- | --- | --- | --- | --- |
| Test # | 1 | 2 | 3 | 4 | 5 | 6 | 7 | 8 | 9 | 10 |
| Comp. | A | A | B | A | A | A | B | A | B | A |
| Additive | — | — | DEG | DEG | DEG | DEG | TEG | TEG | TEG | TEG |
| Amount** | — | — | 2 | 2 | 5 | 5 | 2 | 2 | 5 | 5 |
| $T_{min}$ | 6.1 | 5.0 | 7.0 | 9.0 | 6.5 | 9.1 | 7.2 | 9.3 | 6.3 | 7.7 |
| $T_{max}$ | 9.2 | 41.1 | 56.0* | 54.0 | 58.8 | 55.1 | 55.5* | 53.5 | 57.3 | 52.0 |
| $\Delta T$ | 3.1 | 36.1 | 49.0* | 45.0 | 52.3 | 46.0 | 48.3* | 44.2 | 51.0 | 44.3 |
| $t_s2$ | 2.5 | 2.7 | 2.08 | 1.9 | 1.5 | 1.4 | 1.97 | 1.82 | 1.95 | 1.7 |
| $t_{90}$ | 29.0 | 25.0 | 7.7* | 3.9 | 4.1 | 3.43 | 7.4* | 4.30 | 6.1 | 4.07 |
| $t_{90}/t_s2$ | 11.6 | 9.3 | 3.7* | 2.05 | 2.73 | 2.45 | 3.76* | 2.36 | 3.12 | 2.39 |

*Torque still rising after 12 minutes.
**Amount of DEG or TEG in parts per hundred rubber (phr).

TABLE 4

PHYSICAL PROPERTIES

| Test # | 14 | 15 | 16 | 17 | 18 |
|---|---|---|---|---|---|
| Additive* | — | 2 DEG | 5 DEG | 5 TEG | 2 TEG |
| M100 | 560 | 620 | 580 | 610 | 610 |
| M200 | 1160 | 1330 | 1230 | 1250 | 1210 |
| M300 | 1630 | 1880 | 1800 | 1760 | 1890 |
| TB | 2140 | 2280 | 2210 | 2180 | 2280 |
| EB | 450 | 400 | 390 | 420 | 400 |
| Hardness | 70 | 73 | 72 | 71 | 73 |

*DEG or TEG in parts per hundred rubber (phr).

EXAMPLE 4

Test 17 (5 phr TEG) was repeated but using compositions aged 1 and 3 days at 302° F. The physical properties are listed in Table 5.

TABLE 5

PHYSICAL PROPERTIES, AGED COMPOSITIONS

| Test # | 17 (unaged) | 18 (aged 1 day) | 19 (aged 3 days) |
|---|---|---|---|
| M100 | 610 | 900 | 1060 |
| M200 | 1250 | 1770 | 1910 |
| M300 | 1760 | — | — |
| TB | 2180 | 2220 | 1970 |
| EB | 420 | 280 | 210 |
| Hardness | 71 | 78 | 83 |

EXAMPLE 5

A masterbatch was prepared comprising all of the ingredients, except the crosslinking agent (1,3,4-thiadiozate-5-thiobenzoate) and polyethylene glycol, and was mixed in a type B Banbury laboratory internal mixer. The crosslinking agent and, when used the polyethylene glycol, were added on a laboratory differential speed two roll mill. The mixed rubber composition was cut into test pieces of approximately 1¼ inches×1¼ inches×¼ inch suitable for cure evaluation in an Oscillating Disk Rheometer (ODR, Monsanto Model 100) and were tested using a standard 12 minute ODR run. Samples were tested the same day as prepared (0 days aging or unaged) or aged as specified in the tables and charts. Aging was at 50% relative humidity at 72° F.

TABLE 6

Aging at 50% Relative Humidity at 72° F.,
12 Minute Cure Cycle

| Description | 20 Control | 21 DEG | 22 PEG |
|---|---|---|---|
| Formulation | | | |
| CPE 0136[1] | 100 | 100 | 100 |
| Black N550 | 50 | 50 | 50 |
| Plasticizer TOTM[2] | 35 | 35 | 35 |
| Maglite D Bar[3] | 5 | 5 | 5 |
| Stabilizer[4] | 2 | 2 | 2 |
| Amine Accelerator[5] | 1.15 | 1.15 | 1.15 |
| Crosslinker[6] | 2 | 2 | — |
| Diethylene Glycol | — | 5 | — |
| Polyethylene Glycol[7] | — | — | 5 |

ODR Data, 350° F., 12 minute motor time, 3° arc, 100 CPM
Unaged Samples

TABLE 6-continued

Aging at 50% Relative Humidity at 72° F.,
12 Minute Cure Cycle

| Description | 20 Control | 21 DEG | 22 PEG |
|---|---|---|---|
| Minimum viscosity, in-lbs | 9.8 | 5.3 | 6.1 |
| Maximum viscosity, in-lbs | 46.3* | 52.7 | 46 |
| Δ Torque, in-lbs | 36.5* | 47.4 | 39.9 |
| $t_s2$, minutes[8] | 1.6 | 1.82 | 1.7 |
| $t_{90}$, minutes | 9.25* | 5.02 | 4.59 |
| $t_{90}/t_s2$, minutes | 5.78* | 2.76 | 2.7 |

| 1 Day @ 50% Relative Humidity, 72° F. | | | |
|---|---|---|---|
| Minimum viscosity, in-lbs | 9.9 | 5.8 | 6.7 |
| Maximum viscosity, in-lbs | 50* | 52.5 | 47.7 |
| Δ Torque, in-lbs | 40.1* | 46.4 | 40.8 |
| $t_s2$, minutes[8] | 1.55* | 1.8 | 1.6 |
| $t_{90}$, minutes | 8.59* | 4.6 | 3.59 |
| $t_{90}/t_s2$, minutes | 5.54* | 2.56 | 2.24 |

| 3 Days @ 50% Relative Humidity, 72° F. | | | |
|---|---|---|---|
| Minimum viscosity, in-lbs | 10.2 | 6.5 | 7.9 |
| Maximum viscosity, in-lbs | 53* | 52.5 | 47.7 |
| Δ Torque, in-lbs | 42.8* | 45.7 | 40 |
| $t_s2$, minutes[8] | 1.5 | 1.65 | 1.48 |
| $t_{90}$, minutes | 7.69* | 4.68 | 3.39 |
| $t_{90}/t_s2$, minutes | 5.13* | 2.84 | 2.29 |

| 7 Days @ 50% Relative Humidity, 72° F. | | | |
|---|---|---|---|
| Minimum viscosity, in-lbs | 11.2 | 7.7 | 9.2 |
| Maximum viscosity, in-lbs | 55.6* | 49.9 | 52.3 |
| Δ Torque, in-lbs | 44.4* | 42.2 | 43.1 |
| $t_s2$, minutes[8] | 1.41* | 1.5 | 1.2 |
| $t_{90}$, minutes | 6.55* | 4.7 | 3.69 |
| $t_{90}/t_s2$, minutes | 4.64* | 3.13 | 3.08 |

[1]Tyrin CM 0136, Dow Chemical Co., Plaquemine, LA.
[2]Trioctyl trimellitate.
[3]Magnesium oxide.
[4]WingStay 29 (Goodyear), styrenated diphenylamines.
[5]Vanox 808, N-phenyl-3,5-diethyl-2-propyl-1,4-dihydropyridine.
[6]1,3,4-thiadiazole-5-thiobenzoate (Hercules Incorporated, Wilmington, DE).
[7]Carbowax ® 400, Union Carbide (Range of Average Molecular Weight: 380–420; Average number of repeating oxyethylene units: 8.7).
[8]$t_s2$ measurement limited to 0.1 minute increments for 60 minute experiment.
*Torque still increasing after 12 minutes. Δ Torque, $t_{90}$, and $t_{90}/t_s2$ are based upon maximum torque measured, which is at the end of the 12 minute experiment.

Prior to considering this data, it should be understood that the control samples did not completely cure when they were evaluated using the 12 minute cure cycle normally used in testing samples. If a sample has not been completely cured, the Δ torque level (change in torque level) would be reported lower than actual, which would give lower $t_{90}$ and lower $t_{90}/t_s2$. Where the samples did not reach full cure in 12 minutes, data which depend upon full cure (Δtorque, $t_{90}$, and $t_{90}/t_s2$) were calculated using torque data at 12 minute cure in place of maximum torque. There does not seem to be any technical judgement on how to define a level of maximum torque when the cure is not completed by the end of the 12 minute test, i.e., torque is increasing at the end of the experiment as occurred with the control samples. As a result, it is difficult to compare data from the samples of the invention with the control samples. For instance, from the plots of cure rate versus time it is clear that the torque of the control crosslinking agent is increasing more slowly than the samples of the invention and therefore the control samples were not fully cured during the 12 minute test. If the experiments had continued for another 12 minutes, a total of 24 minutes, the torque of the control sample could increase and thus the value and ratio of $t_{90}/t_s2$.

Because of the uncertainty of measuring $t_{90}$ for the samples that did not fully cure during the 12 minute test because they did not fully cure during the test time, the ODR cure plots were used to evaluate the samples for this experiment. These plots are presented as FIGS. 1–3.

Data on the original, uncured samples shows that the control is not as effective as the invention and does not achieve the desired levels. The control samples were not completely cured after 12 minutes at curing temperature in the ODR. These samples showed a marked increase in the rate of cure after humid aging. This change in cure performance would make it difficult for a manufacturer to operate his process with a standard set of cure conditions. In contrast, the samples of the invention fully cured during the test making them more desirable for commercial use.

The fact that only the samples of the invention achieved full cure can be seen from FIGS. 1–3. FIGS. 2 and 3 shows the ODR cure curves of the samples of the invention. These samples achieved full cure as can be seen from the fact that torque became flat in the upper right corner. Contrast this with the curves for the unaged control samples in FIGS. 1. Those samples did not achieve full cure during the 12 minute test, as can be seen by the fact that the curves were still rising. FIGS. 4–6 are cure rate curves. These Figures show that only the invention samples fully cured, as its curves are the only curves that dropped to a zero cure rate.

FIG. 1 shows that the control samples experienced significant increases in scorch and cure rate after humid aging of 1, 3 and 7 days. FIGS. 2 and 3 show that samples of the invention had much more consistent scorch and cure rate upon humid aging than the control samples. Thus, the invention would provide the most consistent scorch and cure rate properties and are best suited for commercial operations where inconsistent scorch and cure rate will lead to unsuitable products.

From FIGS. 3–6 we see that invention has a higher cure rate and upon aging is acceptable for use in processing.

I claim:

1. A process of reducing the effects of moisture during storage prior to vulcanization of a vulcanizable chlorine- or bromine-containing polymer composition containing water, comprising blending before storage, into said vulcanizable composition, a thioester derivative of 2,5-dimercapto-1,3,4-thiadiazole crosslinking agent and polyethylene glycol having the formula HO—(CH$_2$CH$_2$O—)$_n$H wherein n is 3 to 14, whereby the scorch time of the vulcanizable compound is not significantly affected by the water content of said composition, wherein the vulcanizable composition is stored for at least 1 day, and wherein the vulcanizable composition absorbs about 0.05% to about 2% water by weight of the vulcanizable composition as a result of humidity during storage.

2. The process of claim 1 whereby the cure time of the vulcanizable compound is not significantly affected by the water content of said composition.

3. The process of claim 1 wherein there is included in said composition about 1 to 20 phr 2-mercapto-1,3,4-thiadiazole crosslinking agent and about 0.1 to 20 phr of polyethylene glycol.

4. The process of claim 1 wherein said composition contains at least about 0.05% of water at the start of vulcanization.

5. The process of claim 1 wherein said composition contains about 0.2% to 2% of water at the start of vulcanization.

6. The process of claim 1 wherein the vulcanizable chlorine- or bromine-containing polymer is selected from the group consisting of homopolymers of epichlorohydrin, copolymers of epichlorohydrin and ethylene oxide or propylene oxide, terpolymers of epichlorohydrin, ethylene oxide or propylene oxide, and an unsaturated alkylene oxide, polychloroprene, chlorosulfonated polyethylene, chlorinated high density polyethylene copolymers of alkyl acrylate and chloroalkyl acrylate, poly(vinyl chloride), poly(vinylidene chloride), chlorobutyl rubber and bromobutyl rubber.

7. The process of claim 6 wherein the vulcanizable chlorine- or bromine-containing polymer is selected from the group consisting of epichlorohydrin polymers, copolymers and terpolymers.

8. The process of claim 6 wherein the vulcanizable chlorine- or bromine-containing polymer is a polyacrylate rubber.

9. The process of claim 6 wherein the vulcanizable chlorine- or bromine-containing polymer is chlorinated polyethylene polymer and $t_{90}/t_s2$ is below 4.

10. The process of claim 9 wherein the vulcanizable chlorine- or bromine-containing polymer is chlorinated polyethylene polymer and $t_{90}/t_s2$ is below 3.

11. The process of claim 1 wherein said crosslinking agent is 2-mercapto-1,3,4-thiadiazole-5-thiobenzoate.

12. The process of claim 1 wherein the polyethylene glycol is triethylene glycol.

13. The process of claim 1 wherein n is 4–10.

14. The process of claim 1, wherein the vulcanizable composition absorbs about 0.2 to about 2% water by weight of the vulcanizable composition as a result of humidity during storage.

15. The process of claim 1, wherein the vulcanizable composition is stored for at least 4 days.

* * * * *